United States Patent
Jin et al.

(10) Patent No.: US 10,929,981 B1
(45) Date of Patent: Feb. 23, 2021

(54) GROSS TUMOR VOLUME SEGMENTATION METHOD AND COMPUTER DEVICE

(71) Applicant: Ping An Technology (Shenzhen) Co., Ltd., Shenzhen (CN)

(72) Inventors: Dakai Jin, Laurel, MD (US); Dazhou Guo, Rockville, MD (US); Le Lu, Poolesville, MD (US); Adam Patrick Harrison, Silver Spring, MD (US)

(73) Assignee: Ping An Technology (Shenzhen) Co., Ltd., Shenzhen (CN)

( * ) Notice: Subject to any disclaimer, the term of this patent is extended or adjusted under 35 U.S.C. 154(b) by 63 days.

(21) Appl. No.: 16/546,604

(22) Filed: Aug. 21, 2019

(51) Int. Cl.
*G06T 7/174* (2017.01)
*G06T 7/30* (2017.01)
*G06T 7/11* (2017.01)

(52) U.S. Cl.
CPC ............ *G06T 7/174* (2017.01); *G06T 7/11* (2017.01); *G06T 7/30* (2017.01); *G06T 2207/10081* (2013.01); *G06T 2207/10104* (2013.01); *G06T 2207/20076* (2013.01); *G06T 2207/20081* (2013.01); *G06T 2207/20084* (2013.01); *G06T 2207/20212* (2013.01); *G06T 2207/30061* (2013.01); *G06T 2207/30096* (2013.01)

(58) Field of Classification Search
CPC ... G06T 7/174; G06T 7/11; G06T 7/30; G06T 2207/20081; G06T 2207/30061; G06T 2207/20076; G06T 2207/20212; G06T 2207/10104; G06T 2207/10081; G06T 2207/30096; G06T 2207/20084

USPC .......................................................... 382/131
See application file for complete search history.

(56) References Cited

U.S. PATENT DOCUMENTS

| | | | |
|---|---|---|---|
| 2012/0229141 A1* | 9/2012 | Brown | G01R 33/341 324/322 |
| 2013/0204121 A1* | 8/2013 | Andresen | A61B 6/032 600/411 |
| 2014/0119627 A1* | 5/2014 | Skretting | G06T 7/0016 382/131 |
| 2015/0173847 A1* | 6/2015 | Hayashi | A61B 6/037 600/431 |
| 2016/0140716 A1* | 5/2016 | Kadir | G06T 7/30 382/131 |
| 2018/0247412 A1* | 8/2018 | Gooding | G06T 11/001 |
| 2019/0201717 A1* | 7/2019 | Shangguan | A61N 5/1039 |

* cited by examiner

*Primary Examiner* — Ali Bayat
(74) *Attorney, Agent, or Firm* — ScienBiziP, P.C.

(57) ABSTRACT

In a GTV segmentation method, a PET-CT image pair and an RTCT image of a human body are obtained. A PET image in the PET-CT image pair is aligned to the RTCT image to obtain an aligned PET image. A first PSNN performs a first GTV segmentation on the RTCT image to obtain a first segmentation image. The RTCT image and the aligned PET image are concatenated into a first concatenated image. A second PSNN performs a second GTV segmentation on the first concatenated image to obtain a second segmentation image. The RTCT image, the first segmentation image, and the second segmentation image are concatenated into a second concatenated image. A third PSNN performs a third GTV segmentation on the second concatenated image to obtain an object segmentation image.

20 Claims, 6 Drawing Sheets

| | CT | EF | EF+LF | DSC | HD (mm) | $ASD_{GT}$ (mm) |
|---|---|---|---|---|---|---|
| 3D DenseUNet | ✓ | | | 0.654±0.210 | 129.0±73.0 | 5.2±12.8 |
| | | ✓ | | 0.710±0.189 | 116.0±81.7 | 4.9±10.3 |
| | | | ✓ | 0.745±0.163 | 79.5±70.9 | 4.7±10.5 |
| 3D P-HNN | ✓ | | | 0.710±0.189 | 86.2±67.4 | 4.3±5.3 |
| | | ✓ | | 0.735±0.158 | 57.9±61.1 | 3.6±3.7 |
| | | | ✓ | 0.755±0.148 | 47.2±52.3 | 3.8±4.8 |
| 3D PSNN | ✓ | | | 0.728±0.158 | 66.9±59.2 | 4.2±5.4 |
| | | ✓ | | 0.758±0.136 | 67.0±59.1 | 3.2±3.1 |
| | | | ✓ | 0.764±0.134 | 47.1±56.0 | 3.2±3.3 |

GROSS TUMOR VOLUME SEGMENTATION METHOD AND COMPUTER DEVICE

FIELD

The subject matter herein generally relates to image processing technology, and particularly to a gross tumor volume segmentation method and a computer device.

BACKGROUND

Esophageal cancer ranks sixth in mortality amongst all cancers worldwide, accounting for 1 in 20 cancer deaths. Because esophageal cancer is typically diagnosed at late stages, the primary treatment is a combination of chemotherapy and radiotherapy. One of the most critical tasks in radiotherapy treatment planning is delineating gross tumor volume (GTV). Yet, manual segmentation consumes great amounts of time and effort from oncologists and is subject to inconsistencies. Thus, there is great impetus to develop effective tools for automated GTV segmentation.

However, previous methods are only applied to radiotherapy computed tomography (RTCT) images taken prior to treatment. This limits performance as CT suffers from low contrast between the esophagus, tumor, and surrounding tissues.

BRIEF DESCRIPTION OF THE DRAWINGS

FIG. 4 shows comparisons of the GTV segmentation method of the present disclosure and previous methods.

DETAILED DESCRIPTION

In order to provide a clearer understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

A gross tumor volume (GTV) segmentation method of the present disclosure is applied to one or more computer devices. A computer device is a device capable of automatically performing numerical calculation and/or information processing according to an instruction set or stored in advance, and the hardware thereof includes but is not limited to a microprocessor, an application specific integrated circuit (ASIC), a field-programmable gate array (FPGA), a digital signal processor (DSP), or an embedded device, etc.

The computer device may be a desktop computer, a notebook, a palmtop computer, and a cloud server. The computer device can perform human-computer interaction with a user through a keyboard, a mouse, a remote controller, a touch panel, or a voice control device.

Figure 1:
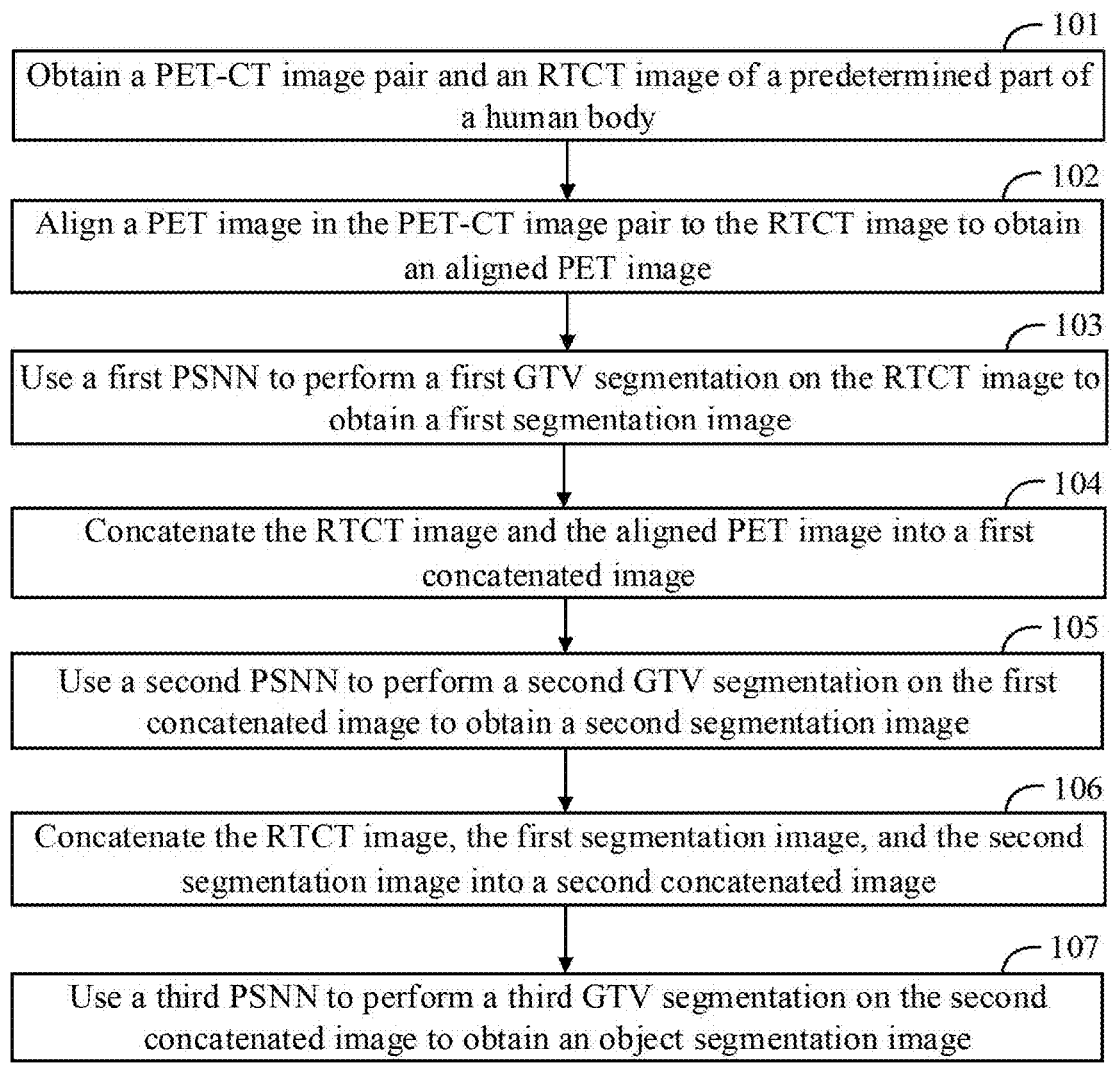
FIG. 1 is a flowchart of one example embodiment of a gross tumor volume (GTV) segmentation method.

FIG. 1 is a flowchart of one example embodiment of a gross tumor volume (GTV) segmentation method. In one embodiment, the GTV segmentation method can be executed by a computer device. The GTV segmentation method performs GTV segmentation based on positron emission tomography (PET) images and radiotherapy computer tomography (RTCT) images.

Referring to FIG. 1, the GTV segmentation method is described below. The illustrated order of blocks is illustrative only and the order of the blocks can be changed. Additional blocks can be added or fewer blocks may be utilized without departing from this disclosure.

At block 101, the computer device may obtain a PET-CT image pair and an RTCT image of a predetermined part of a human body.

In one embodiment, the GTV segmentation method can be applied to perform esophageal GTV segmentation. In this application scenario, the predetermined part is an esophagus. It can be understood that in other scenarios, the preset part may be another part or organ of the human body, and the GTV segmentation method may be applied to perform GTV segmentation on other parts or organs of the human body.

The RTCT image is obtained by CT scan on a day of radiotherapy, and the PET-CT image pair are obtained by PET-CT scan when a patient is checked for cancer diagnosis (usually many days before radiotherapy).

The PET-CT image pair include a PET image and a diagnostic CT image. The PET-CT scan combines functional images (PET images) with anatomical images (diagnostic CT images) to simultaneously reflect information of body anatomy and function.

The PET image, the diagnostic CT image, and the RTCT image are three-dimensional images.

The PET image, the diagnostic CT image, and the RTCT image may be grayscale images, or may be color images such as RGB images, YUV images, or HSV images.

At block 102, the computer device may align the PET image in the PET-CT image pair to the RTCT image to obtain an aligned PET image.

As mentioned above, the RTCT image is an image scanned on the day of radiotherapy, and the PET-CT image pair are scanned when the cancer is diagnosed. There are large differences between the RTCT image and the PET-CT image pair in body ranges, poses for head and arm, and soft and hard scanner boards. In order to exploit both the PET image and the RTCT image for GTV segmentation, it is necessary to align the PET image to the RTCT image, so that each part of the PET image is corresponding to a part of the RTCT image.

In one embodiment, the computer device may align the PET image to the RTCT image by aligning the diagnostic CT image to the RTCT image. In one embodiment, the computer device may align the diagnostic CT image to the RTCT image as follow:

The computer device segments a first lung region from the diagnostic CT image and segments a second lung region from the RTCT image in the PET-CT image pair;

The computer device determines a first lung center from the first lung region and determines a second lung center from the second lung region;

The computer device initially aligns the diagnostic CT image to the RTCT image with the first lung center and the second lung center as initial matching positions;

The computer device registers the diagnostic CT image initially aligned to the RTCT image to obtain a deformation field from the diagnostic CT image to the RTCT image;

The computer device applies the deformation field to the PET image to obtain the aligned PET image.

In one embodiment, the computer device may use a progressive holistically nested network (P-HNN) to segment the first lung region from the diagnostic CT image and segment the second lung region from the RTCT image.

The first lung region and the second lung region are both three-dimensional volumes. In the process of using the P-HNN to segment the first lung region from the diagnostic CT image and segment the second lung region from the RTCT image, the computer device may convert the diagnostic CT image (i.e., three-dimensional diagnostic CT image) into a two-dimensional diagnostic CT image and converts the RTCT image (i.e., three-dimensional RTCT image) into a two-dimensional RTCT image. The computer device may use the P-HNN to segment a first two-dimensional lung region from each two-dimensional diagnostic CT image and segment a second two-dimensional lung region from each two-dimensional RTCT image. According to all first two-dimensional lung regions, the computer device may obtain the first lung region (i.e., first three-dimensional lung region). According to all second two-dimensional lung regions, the computer device may obtain the second lung region (i.e., second three-dimensional lung region).

The computer device may calculate an average value of x-coordinate (denoted as x1), an average value of y-coordinate (denoted as y1), and an average value of z-coordinate (denoted as z1) of all points in the first lung region, and use a point of (x1, y1, z1) as the first lung center of the diagnostic CT image. Similarly, the computer device may calculate an average value of x-coordinate (denoted as x2), an average value of y-coordinate (denoted as y2), and an average value of z-coordinate (denoted as z2) of all points in the second lung region, and use a point of (x2, y2, z2) as the second lung center of the RTCT image.

The P-HNN uses deep supervision to train, and propagates low-level features to high-level. Details of the P-HNN can refer to related technologies and are not described herein.

In other embodiments, other image segmentation algorithms, such as a threshold-based segmentation algorithm or an edge-based segmentation algorithm may be employed to segment the first lung region from the diagnostic CT image and segment the second lung region from the RTCT image.

In one embodiment, the computer device may use a B-spline deformable registration algorithm to register the diagnostic CT image initially aligned to the RTCT image.

For example, the computer device may use a cubic B-spline deformable alignment algorithm to register the diagnostic CT image initially aligned to the RTCT image.

The B-spline deformable alignment algorithm can be applied to a coarse-to-fine multi-scale deformation process to achieve registration of the diagnostic CT image initially aligned to the RTCT image.

The B-spline deformable alignment algorithm can refer to related technologies, and details are not described herein.

In other embodiments, other alignment algorithms (e.g., least squares) may be employed to register the diagnostic CT image initially aligned to the RTCT image.

At block 103, the computer device may use a first progressive semantically nested network (PSNN) to perform a first GTV segmentation on the RTCT image to obtain a first segmentation image.

The RTCT image is fed as input to the first PSNN. The first PSNN performs the first GTV segmentation on the RTCT image to obtain the first segmentation image.

The first PSNN is trained using training data including RTCT images in advance. A structure and a training method of the first PSNN are described later.

At block 104, the computer device may concatenate the RTCT image and the aligned PET image into a first concatenated image.

Concatenation of the RTCT image and the aligned PET image means to fuse information of the RTCT image and the aligned PET image, so that the first concatenated image includes information of the RTCT image and the aligned PET image.

At block 105, the computer device may use a second PSNN to perform a second GTV segmentation on the first concatenated image to obtain a second segmentation image.

The first concatenated image is fed as input to the second PSNN. The second PSNN performs the second GTV segmentation on the first concatenated image to obtain the second segmentation image. The object segmentation image is a final segmentation result.

The second PSNN is trained using training data including RTCT images and aligned PET images in advance. A structure and a training method of the second PSNN are described later.

At block 106, the computer device may concatenate the RTCT image, the first segmentation image, and the second segmentation image into a second concatenated image.

Concatenation of the RTCT image, the first segmentation image, and the second segmentation image means to fuse information of the RTCT image, the first segmentation image, and the second segmentation image, so that the second concatenated image includes information of the RTCT image, the first segmentation image, and the second segmentation image.

At block 107, the computer device may use a third PSNN to perform a third GTV segmentation on the second concatenated image to obtain an object segmentation image.

The second concatenated image is fed as input to the third PSNN. The third PSNN performs the third GTV segmentation on the second concatenated image to obtain a final segmentation result.

The third PSNN is trained using training data including RTCT images and segmentation results from the first PSNN and the second PSNN in advance. A structure and a training method of the third PSNN are described later.

Figure 2:
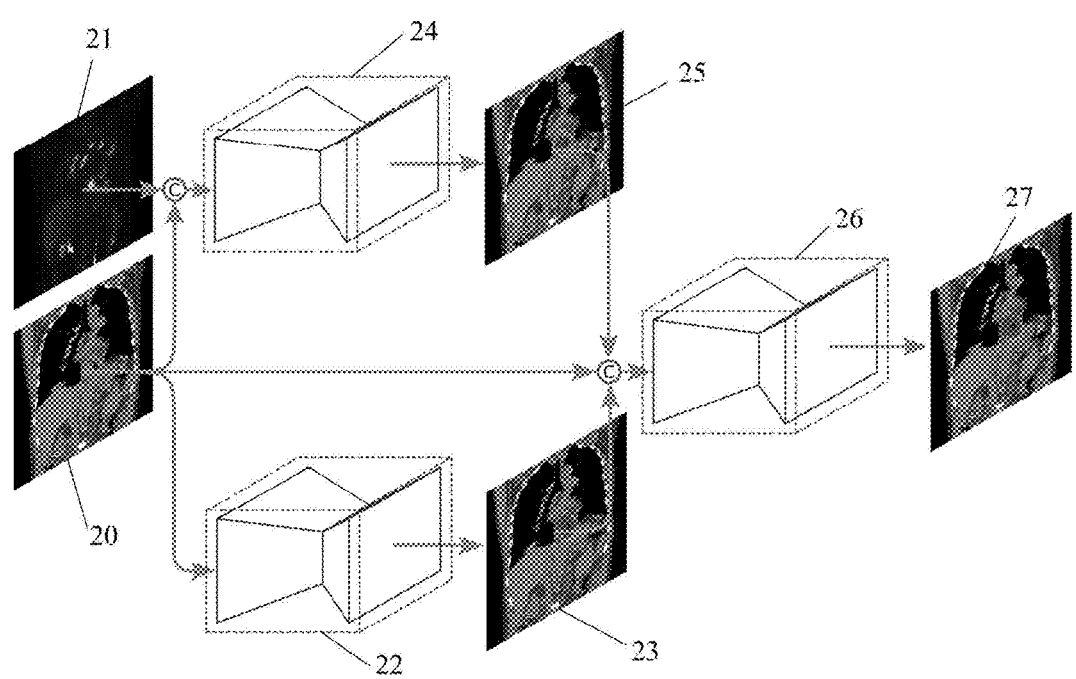
FIG. 2 depicts a GTV segmentation method based on an RTCT image and an aligned positron emission tomography (PET) image.

FIG. 2 depicts a GTV segmentation method based on an RTCT image and an aligned PET image. In FIG. 2, "20" denotes the RTCT image. "21" denotes the aligned PET image. "22" denotes a first PSNN. "24" denotes a second PSNN. "26" denotes a third PSNN. The first PSNN "22" performs a first GTV segmentation on the RTCT image "20" to obtain a first segmentation image "23". The second PSNN "24" performs a second GTV segmentation on a first concatenated image of the RTCT image "20" and the aligned PET image "21" to obtain a second segmentation image "25". The third PSNN "26" performs a third GTV segmentation on a second concatenated image of the RTCT image, the first segmentation image, and the second segmentation image to obtain an object segmentation image "27". The object segmentation image "27" is a final segmentation result.

The second GTV segmentation on the first concatenated image obtained by concatenating the RTCT image and the aligned PET image can be regarded as an early fusion (EF) of the RTCT image and the aligned PET image. The third GTV segmentation on the second concatenated image of the RTCT image, the first segmentation image, and the second segmentation image can be regarded as a late fusion (LF) of the RTCT image, the first segmentation image and the second segmentation image. Incorporation of the early fusion and the late fusion can be called a two-stream chained pipeline.

The first PSNN performs the first GTV segmentation only based on the RTCT image, which can be particularly helpful in circumventing a biased influence from noisy non-malignant high uptake regions, which are not uncommon in PET images.

The second PSNN performs the second GTV segmentation based on the RTCT image and the aligned PET image, enjoying high spatial resolution and high tumor-intake contrast properties from the RTCT image and the aligned PET image, respectively.

The third PSNN performs the third GTV segmentation based on the RTCT image and segmentation results of the first PSNN and the second PSNN, which can further improve a segmentation performance.

Figure 3:
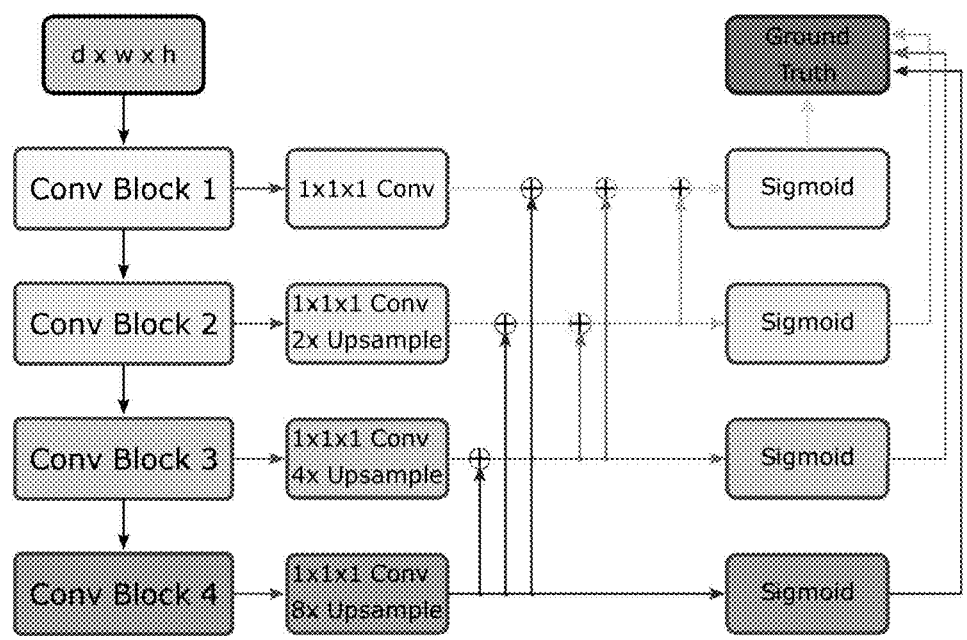
FIG. 3 depicts a progressive semantically nested network (PSNN) used in the present disclosure.

FIG. 3 depicts a progressive semantically nested network (PSNN) used in the present disclosure.

The PSNN used in the present disclosure includes a plurality of levels. The higher the level, the lower the resolution. The PSNN shown in FIG. 3 includes four levels, which are sequentially referred to as a first level, a second level, a third level, and a fourth level from top to bottom. Each level includes a convolutional block, a 1×1×1 convolutional layer, and a sigmoid function. Prior to applying the sigmoid function, current level features are added to higher level features. The current level features and the higher-level features are logit images that are outputs of 1×1×1 convolutional layers. In one example with respect to FIG. 3, second level features, third level features, fourth level features are propagated to the first level and are added to first level features to obtain first aggregated features. The third level features and the fourth level features are propagated to the second level and are added to the second level features to obtain second aggregated features. The fourth level features are propagated to the third level and are added to the third level features to obtain third aggregated features. A sigmoid function is applied to each of the first aggregated features, the second aggregated features, and the third aggregated features to obtain a GTV probability map. It should be noted that the highest-level features (for example, the fourth level features) does not need to perform feature addition, and a GTV probability map is directly obtained by applying a sigmoid function. When training the PSNN, the GTV probability map of each level is compared with a ground truth GTV segmentation image, and network parameters of the PSNN are optimized according to errors between the GTV probability map of each level and the ground truth GTV segmentation image.

In one embodiment with respect to FIG. 3, the first two convolutional blocks (i.e., Conv Block 1 and Conv Block 2) are composed of two 3×3×3 convolutional layers, a batch normalization (BN) layer, and a rectified linear unit (ReLU) layer. The last two convolutional blocks (i.e., Conv Block 3 and Conv Block 4) are composed of three 3×3×3 convolutional layers, a batch normalization (BN) layer, and a rectified linear unit (ReLU) layer.

The levels of the PSNN (e.g., the first PSNN) and a composition of each convolutional block (e.g., Conv Block 1) can be changed. For example, the PSNN may include five levels, and convolutional layer of each convolutional block may be increased or decreased.

In one embodiment, the first PSNN, the second PSNN, and the third PSNN have same network structures for simplicity and consistency. The first PSNN, the second PSNN, and the third PSNN reverse a direction of deeply-supervised pathways based on a progressive holistically nested network (P-HNN) to propagate high-level features to lower-level features.

In other embodiments, the network structures of the first PSNN, the second PSNN, and the third PSNN may be different.

In GTV segmentation, such as esophageal GTV segmentation, a GTV target region often exhibits low contrast in CT images, and physician's manual delineation relies heavily upon high-level semantic information to disambiguate boundaries. In certain respects, this aligns with the intuition behind UNet, which decodes high-level features into lower-level space. Nonetheless, a decoding path in UNet consumes a great deal of parameters, adding to complexity of the UNet. On the other hand, P-HNN uses deep supervision to connect lower and higher-level features together using parameter-less pathways. However, unlike UNet, P-HNN propagates low-level features to higher-level layers. The present disclosure combines strengths of both P-HNN and UNet to use essentially same parameter blocks as P-HNN, but reverse a direction of deeply-supervised pathways, to propagate high-level information to lower-level space.

Training of the first PSNN, the second PSNN, and the third PSNN is described below.

Assuming N training instances, training data are denoted as $S=\{(X_n^{CT}, X_n^{PET}, Y_n)\}_{n=1}^N$. $X_n^{CT}$, $X_n^{PET}$, and $Y_n$ represent RTCT sample images, aligned PET sample images, and binary ground truth GTV segmentation images, respectively. The first PSNN generates first segmentation images using $X_n^{CT}$ as network inputs (referring to equation (1)). The second PSNN generates second segmentation images using $[X_n^{CT}, X_n^{PET}]$ as network inputs (referring to equation (2)).

$$\hat{y}_j^{CT} = p_j^{CT}(y_j = 1 | X^{CT}; W^{CT}), \quad (1)$$

$$\hat{y}_j^{EF} = p_j^{EF}(y_j = 1 | X^{CT}, X^{PET}; W^{CT}), \quad (2)$$

In the equations (1) and (2), $p_j^{(\cdot)}(\cdot)$ and $\hat{y}_j^{(\cdot)}$ denote network functions and output segmentation images of the training instances, respectively, $W^{(\cdot)}$ represents corresponding network parameters, and $y_j$ indicates ground truth GTV segmentation values.

Outputs from equation (1) and equation (2) are harmonized by concatenating the first segmentation images and the second segmentation images of the training instances together with original RTCT sample images as inputs to the third PSNN:

$$\hat{y}_j^{LF} = p_j^{LF}(y_j = 1 | X^{CT}, \hat{y}^{CT}, \hat{y}^{EL}; W^{CT}, W^{EF}, W^{LF}). \quad (3)$$

As shown in FIG. 3, a set of 1×1×1 3D convolutional layers are used to collapse a feature map after each convolutional block into a logit image, i.e., $f_j^{(l)}$, where j indexes pixel locations. The logit image is then combined with previous higher-level logit image to create an aggregated logit map, i.e., $f_j^{(l)}$, for a $l^{th}$ feature block by element-wise summation.

$$f_j^{(m)} = \tilde{f}_j^{(m)}, \tag{4}$$

$$f_j^{(l)} = \tilde{f}_j^{(l)} + g(f_j^{(l+1)}), \forall l \in \{m-1, \ldots, 1\}. \tag{5}$$

In the equations (4) and (5), m denotes a total number of predicted feature maps and g(•) denotes an upsampling, i.e., bilinear upsampling. Each PSNN is trained using multiple deeply-supervised auxiliary losses at each convolutional block.

In one embodiment, training of the first PSNN may include: obtaining multiple training instances, each training instance comprising a RTCT sample image, an aligned PET sample image, and a binary ground truth GTV segmentation image; inputting the RTCT sample image to the first PSNN to obtain a first GTV probability map of each level of the first PSNN; calculating a first loss of each level of the first PSNN according to the first GTV probability map and the binary ground truth GTV segmentation image; and optimizing network parameters of the first PSNN according to the first loss.

Training of the second PSNN may include: concatenating the RTCT sample image and the aligned PET sample image into a first concatenated image of the training instance; inputting the first concatenated image of the training instance to the second PSNN to obtain a second GTV probability map of each level of the second PSNN; calculating a second loss of each level of the second PSNN according to the second GTV probability map and the binary ground truth GTV segmentation image; and optimizing network parameters of the second PSNN according to the second loss.

Training of the second PSNN may include: concatenating the RTCT sample image, a first segmentation image of the training instance derived from the first GTV probability map, and a second segmentation image of the training instance derived from the second GTV probability map into a second concatenated image of the training instance; inputting the second concatenated image of the training instance to the third PSNN to obtain a third GTV probability map of each level of the third PSNN; calculating a third loss of each level of the third PSNN according to the third GTV probability map and the binary ground truth GTV segmentation image; and optimizing network parameters of the third PSNN according to the third loss.

In one embodiment, a first GTV probability map of first level of the first PSNN may be selected as the first segmentation image of the training instance. A second GTV probability map of first level of the second PSNN may be selected as the second segmentation image of the training instance.

The first PSNN, the second PSNN, and the third PSNN may be trained using Dice loss functions. Dice loss may be calculated for all three PSNNs, training each PSNN in isolation.

In one embodiment, a dataset of multiple esophageal cancer patients is used to train the PSNNs. All aligned PET sample images and RTCT sample images are resampled to a fixed resolution of 1.0×1.0×2.5 mm. To generate positive training instances, 80×80×64 sub-volumes centered inside ground truth GTV segmentation images are randomly sampled. Negative training instances are extracted by randomly sampling from a whole 3D volume. On average 80 training sub-volumes per patient are obtained.

In one embodiment, training data of the first PSNN, the second PSNN, and the third PSNN are augmented by randomly rotating the training data in a horizontal plane within preset degrees. For example, random rotations in the horizontal plane within ±10 degrees are applied to the training data to augment the training data.

The GTV segmenting method incorporates strengths of both UNet and P-HNN by using deep supervision to progressively propagate high-level semantic features to lower-level, but higher resolution features. The first PSNN performs the first GTV segmentation only based on the RTCT image, which can be helpful in circumventing a biased influence from noisy non-malignant high uptake regions. The second PSNN performs the second GTV segmentation based on the RTCT image and the aligned PET image, enjoying high spatial resolution and high tumor-intake contrast properties from the RTCT image and the aligned PET image, respectively. The third PSNN performs the third GTV segmentation based on the RTCT image and segmentation results of the first PSNN and the second PSNN, which can further improve a segmentation performance. The present disclosure achieves significant improvements in GTV segmentation.

To evaluate performances of the present disclosure, extensive 5-fold cross-validation are employed on 110 esophageal cancer patients. FIG. 4 shows comparisons of the proposed GTV segmentation method of the present disclosure and previous methods. Experiments demonstrate that all three networks (i.e., DenseUNet, P-HNN, and PSNN) trained using the EF of equation (2) consistently produce more accurate segmentation results than those trained with only RTCT images, which validates the effectiveness of utilizing PET images to complement RTCT images for GTV segmentation. Experiments also demonstrate that the two-stream chained fusion pipeline of equation (3) provides further performance improvements. Importantly, the performance boosts can be observed across the three networks (i.e., DenseUNet, P-HNN, and PSNN), validating that the two-stream combination of EF and LF can universally improve upon different backbone segmentation models. Compared with a DenseUNet GTV segmentation method based on the RTCT image, Dice similarity coefficient (DSC) of the present disclosure is improved by 0.11, Hausdorff distance (HD) is decreased by 81.9 mm, and average surface distance with respect to ground truth contour ($ASD_{GT}$) is decreased by 2.0 mm.

Figure 5:
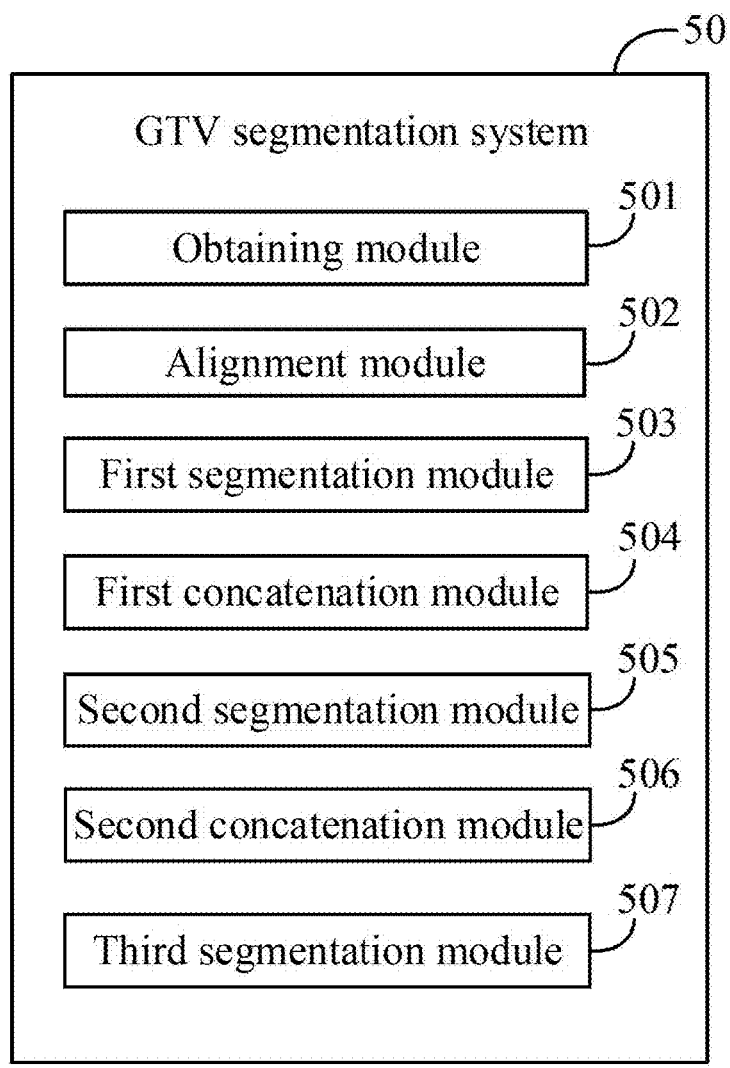
FIG. 5 is a block diagram of one example embodiment of function modules of a gross tumor volume (GTV) segmentation system.

FIG. 5 is a block diagram of one example embodiment of function modules of a gross tumor volume (GTV) segmentation system.

In some embodiments, the GTV segmentation system 50 runs in a computer device. The GTV segmentation system 50 can include a plurality of modules. The plurality of modules can comprise computerized instructions in a form of one or more computer-readable programs that can be stored in a non-transitory computer-readable medium (e.g., a storage device of the computer device), and executed by at least one processor of the computer device to implement GTV segmentation function (described in detail in FIG. 1).

In at least one embodiment, the GTV segmentation system 50 can include a plurality of modules. The plurality of modules can include, but is not limited to an obtaining module 501, an alignment module 502, a first segmentation module 503, a first concatenation module 504, a second segmentation module 505, a second concatenation module 506, and a third segmentation module 507. The modules 501-507 can comprise computerized instructions in the form of one or more computer-readable programs that can be stored in the non-transitory computer-readable medium (e.g., the storage device of the computer device), and executed by the at least one processor of the computer device to implement GTV segmentation function (e.g., described in detail in FIG. 1).

The obtaining module 501 may obtain a PET-CT image pair and an RTCT image of a predetermined part of a human body.

In one embodiment, the GTV segmentation system 50 may perform esophageal GTV segmentation. In this application scenario, the predetermined part is an esophagus. It can be understood that in other scenarios, the preset part may be another part or organ of the human body, and the GTV segmentation system 50 may perform GTV segmentation on other parts or organs of the human body.

The RTCT image is obtained by CT scan on a day of radiotherapy, and the PET-CT image pair are obtained by PET-CT scan when a patient is checked for cancer diagnosis (usually many days before radiotherapy).

The PET-CT image pair include a PET image and a diagnostic CT image. The PET-CT scan combines functional images (PET images) with anatomical images (diagnostic CT images) to simultaneously reflect information of body anatomy and function.

The PET image, the diagnostic CT image, and the RTCT image are three-dimensional images.

The PET image, the diagnostic CT image, and the RTCT image may be grayscale images, or may be color images such as RGB images, YUV images, or HSV images.

The alignment module 502 may align the PET image in the PET-CT image pair to the RTCT image to obtain an aligned PET image.

As mentioned above, the RTCT image is an image scanned on the day of radiotherapy, and the PET-CT image pair are scanned when the cancer is diagnosed. There are large differences between the RTCT image and the PET-CT image pair in body ranges, poses for head and arm, and soft and hard scanner boards. In order to exploit both the PET image and the RTCT image for GTV segmentation, it is necessary to align the PET image to the RTCT image, so that each part of the PET image is corresponding to a part of the RTCT image.

In one embodiment, the alignment module 502 may align the PET image to the RTCT image by aligning the diagnostic CT image to the RTCT image. In one embodiment, the alignment module 502 aligns the diagnostic CT image to the RTCT image as follow:

The alignment module 502 segments a first lung region from the diagnostic CT image and segments a second lung region from the RTCT image in the PET-CT image pair;

The alignment module 502 determines a first lung center from the first lung region and determines a second lung center from the second lung region;

The alignment module 502 initially aligns the diagnostic CT image to the RTCT image with the first lung center and the second lung center as initial matching positions;

The alignment module 502 registers the diagnostic CT image initially aligned to the RTCT image to obtain a deformation field from the diagnostic CT image to the RTCT image;

The alignment module 502 applies the deformation field to the PET image to obtain the aligned PET image.

In one embodiment, the alignment module 502 uses a progressive holistically nested network (P-HNN) to segment the first lung region from the diagnostic CT image and segment the second lung region from the RTCT image.

The first lung region and the second lung region are both three-dimensional volumes. In the process of using the P-HNN to segment the first lung region from the diagnostic CT image and segment the second lung region from the RTCT image, the alignment module 502 may convert the diagnostic CT image (i.e., three-dimensional diagnostic CT image) into a two-dimensional diagnostic CT image and converts the RTCT image (i.e., three-dimensional RTCT image) into a two-dimensional RTCT image. The alignment module 502 may use the P-HNN to segment a first two-dimensional lung region from each two-dimensional diagnostic CT image and segment a second two-dimensional lung region from each two-dimensional RTCT image. According to all first two-dimensional lung regions, the alignment module 502 may obtain the first lung region (i.e., first three-dimensional lung region). According to all second two-dimensional lung regions, the alignment module 502 may obtain the second lung region (i.e., second three-dimensional lung region).

The alignment module 502 may calculate an average value of x-coordinate (denoted as x1), an average value of y-coordinate (denoted as y1), and an average value of z-coordinate (denoted as z1) of all points in the first lung region, and use a point of (x1, y1, z1) as the first lung center of the diagnostic CT image. Similarly, the alignment module 502 may calculate an average value of x-coordinate (denoted as x2), an average value of y-coordinate (denoted as y2), and an average value of z-coordinate (denoted as z2) of all points in the second lung region, and use a point of (x2, y2, z2) as the second lung center of the RTCT image.

The P-HNN uses deep supervision to train, and propagates low-level features to high-level. Details of the P-HNN can refer to related technologies and are not described herein.

In other embodiments, other image segmentation algorithms, such as a threshold-based segmentation algorithm or an edge-based segmentation algorithm may be employed to segment the first lung region from the diagnostic CT image and segment the second lung region from the RTCT image.

In one embodiment, the alignment module 502 may use a B-spline deformable registration algorithm to register the diagnostic CT image initially aligned to the RTCT image.

For example, the alignment module 502 may use a cubic B-spline deformable alignment algorithm to register the diagnostic CT image initially aligned to the RTCT image.

The B-spline deformable alignment algorithm can be applied to a coarse-to-fine multi-scale deformation process to achieve registration of the diagnostic CT image initially aligned to the RTCT image.

The B-spline deformable alignment algorithm can refer to related technologies, and details are not described herein.

In other embodiments, other alignment algorithms (e.g., least squares) may be employed to register the diagnostic CT image initially aligned to the RTCT image.

The first segmentation module 503 may use a first progressive semantically nested network (PSNN) to perform a first GTV segmentation on the RTCT image to obtain a first segmentation image.

The RTCT image is fed as input to the first PSNN. The first PSNN performs the first GTV segmentation on the RTCT image to obtain the first segmentation image.

The first PSNN is trained using training data including RTCT images in advance. A structure and a training method of the first PSNN are described later.

The first concatenation module 504 may concatenate the RTCT image and the aligned PET image into a first concatenated image.

Concatenation of the RTCT image and the aligned PET image means to fuse information of the RTCT image and the aligned PET image, so that the first concatenated image includes information of the RTCT image and the aligned PET image.

The second segmentation module 505 may use a second PSNN to perform a second GTV segmentation on the first concatenated image to obtain a second segmentation image.

The first concatenated image is fed as input to the second PSNN. The second PSNN performs the second GTV segmentation on the first concatenated image to obtain the second segmentation image. The object segmentation image "27" is a final segmentation result.

The second PSNN is trained using training data including RTCT images and aligned PET images in advance. A structure and a training method of the second PSNN are described later.

The second concatenation module 506 may concatenate the RTCT image, the first segmentation image, and the second segmentation image into a second concatenated image.

Concatenation of the RTCT image, the first segmentation image, and the second segmentation image means to fuse information of the RTCT image, the first segmentation image, and the second segmentation image, so that the second concatenated image includes information of the RTCT image, the first segmentation image, and the second segmentation image.

The third segmentation module 507 may use a third PSNN to perform a third GTV segmentation on the second concatenated image to obtain an object segmentation image.

The second concatenated image is fed as input to the third PSNN. The third PSNN performs the third GTV segmentation on the second concatenated image to obtain a final segmentation result.

The third PSNN is trained using training data including RTCT images and segmentation results from the first PSNN and the second PSNN in advance. A structure and a training method of the third PSNN are described later.

FIG. 2 depicts a GTV segmentation method of the GTV segmentation system 50 based on an RTCT image and an aligned PET image. In FIG. 2, "20" denotes the RTCT image. "21" denotes the aligned PET image. "22" denotes a first PSNN. "24" denotes a second PSNN. "26" denotes a third PSNN. The first PSNN "22" performs a first GTV segmentation on the RTCT image "20" to obtain a first segmentation image "23". The second PSNN "24" performs a second GTV segmentation on a first concatenated image of the RTCT image "20" and the aligned PET image "21" to obtain a second segmentation image "25". The third PSNN "26" performs a third GTV segmentation on a second concatenated image of the RTCT image, the first segmentation image, and the second segmentation image to obtain an object segmentation image "27". The object segmentation image "27" is a final segmentation result.

The second GTV segmentation on the first concatenated image obtained by concatenating the RTCT image and the aligned PET image can be regarded as an early fusion (EF) of the RTCT image and the aligned PET image. The third GTV segmentation on the second concatenated image of the RTCT image, the first segmentation image, and the second segmentation image can be regarded as a late fusion (LF) of the RTCT image, the first segmentation image and the second segmentation image. Incorporation of the early fusion and the late fusion can be called a two-stream chained pipeline.

The first PSNN performs the first GTV segmentation only based on the RTCT image, which can be particularly helpful in circumventing a biased influence from noisy non-malignant high uptake regions, which are not uncommon in PET images.

The second PSNN performs the second GTV segmentation based on the RTCT image and the aligned PET image, enjoying high spatial resolution and high tumor-intake contrast properties from the RTCT image and the aligned PET image, respectively.

The third PSNN performs the third GTV segmentation based on the RTCT image and segmentation results of the first PSNN and the second PSNN, which can further improve a segmentation performance.

FIG. 3 depicts a progressive semantically nested network (PSNN) used in the present disclosure.

The PSNN used in the present disclosure includes a plurality of levels. The higher the level, the lower the resolution. The PSNN shown in FIG. 3 includes four levels, which are sequentially referred to as a first level, a second level, a third level, and a fourth level from top to bottom. Each level includes a convolutional block, a 1×1×1 convolutional layer, and a sigmoid function. Prior to applying the sigmoid function, current level features are added to higher level features. The current level features and the higher-level features are logit images that are outputs of 1×1×1 convolutional layers. In one example with respect to FIG. 3, second level features, third level features, fourth level features are propagated to the first level and are added to first level features to obtain first aggregated features. The third level features and the fourth level features are propagated to the second level and are added to the second level features to obtain second aggregated features. The fourth level features are propagated to the third level and are added to the third level features to obtain third aggregated features. A sigmoid function is applied to each of the first aggregated features, the second aggregated features, and the third aggregated features to obtain a GTV probability map. It should be noted that the highest-level features (for example, the fourth level features) does not need to perform feature addition, and a GTV probability map is directly obtained by applying a sigmoid function. When training the PSNN, the GTV probability map of each level is compared with a ground truth GTV segmentation image, and network parameters of the PSNN are optimized according to errors between the GTV probability map of each level and the ground truth GTV segmentation image.

In one embodiment with respect to FIG. 3, the first two convolutional blocks (i.e., Conv Block 1 and Conv Block 2) are composed of two 3×3×3 convolutional layers, a batch normalization (BN) layer, and a rectified linear unit (ReLU) layer. The last two convolutional blocks (i.e., Conv Block 3 and Conv Block 4) are composed of three 3×3×3 convolutional layers, a batch normalization (BN) layer, and a rectified linear unit (ReLU) layer.

The levels of the PSNN (e.g., the first PSNN) and a composition of each convolutional block (e.g., Conv Block 1) can be changed. For example, the PSNN may include five levels, and convolutional layer of each convolutional block may be increased or decreased.

In one embodiment, the first PSNN, the second PSNN, and the third PSNN have same network structures for simplicity and consistency. The first PSNN, the second PSNN, and the third PSNN reverse a direction of deeply-supervised pathways based on a progressive holistically nested network (P-HNN), to propagate high-level features to lower-level features.

In other embodiments, the network structures of the first PSNN, the second PSNN, and the third PSNN may be different.

In GTV segmentation, such as esophageal GTV segmentation, a GTV target region often exhibits low contrast in CT images, and physician's manual delineation relies heavily upon high-level semantic information to disambiguate boundaries. In certain respects, this aligns with the intuition behind UNet, which decodes high-level features into lower-level space. Nonetheless, a decoding path in UNet consumes a great deal of parameters, adding to complexity of the UNet. On the other hand, P-HNN uses deep supervision to connect lower and higher-level features together using parameter-less pathways. However, unlike UNet, P-HNN propagates lower-level features to high-level layers. The present disclosure combines strengths of both P-HNN and UNet to use essentially same parameter blocks as P-HNN, but reverse a direction of deeply-supervised pathways, to propagate high-level information to lower-level space.

Training of the first PSNN, the second PSNN, and the third PSNN is described below.

Assuming N training instances, training data are denoted as $S=\{(X_n^{CT}, X_n^{PET}, Y_n)\}_{n=1}^{N}$. $X_n^{CT}$, $X_n^{PET}$, and $Y_n$ represent RTCT sample images, aligned PET sample images, and binary ground truth GTV segmentation images, respectively. The first PSNN generates first segmentation images using $X_n^{CT}$ as network inputs (referring to equation (1)). The second PSNN generates second segmentation images using $[X_n^{CT}, X_n^{PET}]$ as network inputs (referring to equation (2)).

$$\hat{y}_j^{CT} = p_j^{CT}(y_j=1|X^{CT}; W^{CT}), \quad (1)$$

$$\hat{y}_j^{EF} = p_j^{EF}(y_j=1|X^{CT}, X^{PET}; W^{CT}), \quad (2)$$

In the equations (1) and (2), $p_j^{(\cdot)}(\bullet)$ and $\hat{y}_j^{(\cdot)}$ denote network functions and output segmentation images of the training instances, respectively, $W^{(\cdot)}$ represents corresponding network parameters, and $y_j$ indicates ground truth GTV segmentation values.

Outputs from equation (1) and equation (2) are harmonized by concatenating the first segmentation images and the second segmentation images of the training instances together with original RTCT sample images as inputs to the third PSNN:

$$\hat{y}_j^{LF} = p_j^{LF} = 1|X^{CT}, \hat{y}^{CT}, \hat{y}^{EL}; W^{CT}, W^{EF}, W^{LF}). \quad (3)$$

As shown in FIG. 3, a set of 1×1×1 3D convolutional layers are used to collapse a feature map after each convolutional block into a logit image, i.e., $\tilde{f}_j^{(l)}$, where j indexes pixel locations. The logit image is then combined with previous higher-level logit image to create an aggregated logit map, i.e., $f_j^{(l)}$, for a $l^{th}$ feature block by element-wise summation.

$$f_j^{(m)} = \tilde{f}_j^{(m)}, \quad (4)$$

$$f_j^{(l)} = \tilde{f}_j^{(l)} + g(f_j^{(l+1)}), \forall l \in \{m-1, \ldots, 1\}. \quad (5)$$

In the equations (4) and (5), m denotes a total number of predicted feature maps and g(•) denotes an upsampling, i.e., bilinear upsampling. Each PSNN is trained using multiple deeply-supervised auxiliary losses at each convolutional block.

In one embodiment, training of the first PSNN may include: obtaining multiple training instances, each training instance comprising a RTCT sample image, an aligned PET sample image, and a binary ground truth GTV segmentation image; inputting the RTCT sample image to the first PSNN to obtain a first GTV probability map of each level of the first PSNN; calculating a first loss of each level of the first PSNN according to the first GTV probability map and the binary ground truth GTV segmentation image; and optimizing network parameters of the first PSNN according to the first loss.

Training of the second PSNN may include: concatenating the RTCT sample image and the aligned PET sample image into a first concatenated image of the training instance; inputting the first concatenated image of the training instance to the second PSNN to obtain a second GTV probability map of each level of the second PSNN; calculating a second loss of each level of the second PSNN according to the second GTV probability map and the binary ground truth GTV segmentation image; and optimizing network parameters of the second PSNN according to the second loss.

Training of the second PSNN may include: concatenating the RTCT sample image, a first segmentation image of the training instance derived from the first GTV probability map, and a second segmentation image of the training instance derived from the second GTV probability map into a second concatenated image of the training instance; inputting the second concatenated image of the training instance to the third PSNN to obtain a third GTV probability map of each level of the third PSNN; calculating a third loss of each level of the third PSNN according to the third GTV probability map and the binary ground truth GTV segmentation image; and optimizing network parameters of the third PSNN according to the third loss.

In one embodiment, a first GTV probability map of first level of the first PSNN may be selected as the first segmentation image of the training instance. A second GTV probability map of first level of the second PSNN may be selected as the second segmentation image of the training instance.

The first PSNN, the second PSNN, and the third PSNN may be trained using Dice loss functions. Dice loss may be calculated for all three PSNNs, training each PSNN in isolation.

In one embodiment, a dataset of multiple esophageal cancer patients is used to train the PSNNs. All aligned PET sample images and RTCT sample images are resampled to a fixed resolution of 1.0×1.0×2.5 mm. To generate positive training instances, 80×80×64 sub-volumes centered inside ground truth GTV segmentation images are randomly sampled. Negative training instances are extracted by randomly sampling from a whole 3D volume. On average 80 training sub-volumes per patient are obtained.

In one embodiment, training data of the first PSNN, the second PSNN, and the third PSNN are augmented by randomly rotating the training data in a horizontal plane within preset degrees. For example, random rotations in the horizontal plane within ±10 degrees are applied to the training data to augment the training data.

The GTV segmenting system 50 incorporates strengths of both UNet and P-HNN by using deep supervision to progressively propagate high-level semantic features to lower-level, but higher resolution features. The first PSNN performs the first GTV segmentation only based on the RTCT image, which can be helpful in circumventing a biased influence from noisy non-malignant high uptake regions. The second PSNN performs the second GTV segmentation based on the RTCT image and the aligned PET image, enjoying high spatial resolution and high tumor-intake contrast properties from the RTCT image and the aligned PET image, respectively. The third PSNN performs the third GTV segmentation based on the RTCT image and segmentation results of the first PSNN and the second PSNN, which can further improve a segmentation performance. The present disclosure achieves significant improvements in GTV segmentation.

To evaluate performances of the present disclosure, extensive 5-fold cross-validation are employed on 110 esophageal cancer patients. FIG. 4 shows comparisons of the GTV segmentation system 50 and previous systems. Experiments demonstrate that all three networks (i.e., DenseUNet, P-HNN, and PSNN) trained using the EF of equation (2) consistently produce more accurate segmentation results than those trained with only RTCT images, which validates the effectiveness of utilizing PET images to complement RTCT images for GTV segmentation. Experiments also demonstrate that the full two-stream chained fusion pipeline of equation (3) provides further performance improvements. Importantly, the performance boosts can be observed across the three networks (i.e., DenseUNet, P-HNN, and PSNN), validating that the two-stream combination of EF and LF can universally improve upon different backbone segmentation models. Compared with a GTV segmentation system based on the RTCT image using DenseUNet, Dice similarity coefficient (DSC) of the present disclosure is improved by 0.11, Hausdorff distance (HD) is decreased by 81.9 mm, and average surface distance with respect to ground truth contour ($ASD_Gr$) is decreased by 2.0 mm.

Figure 6:
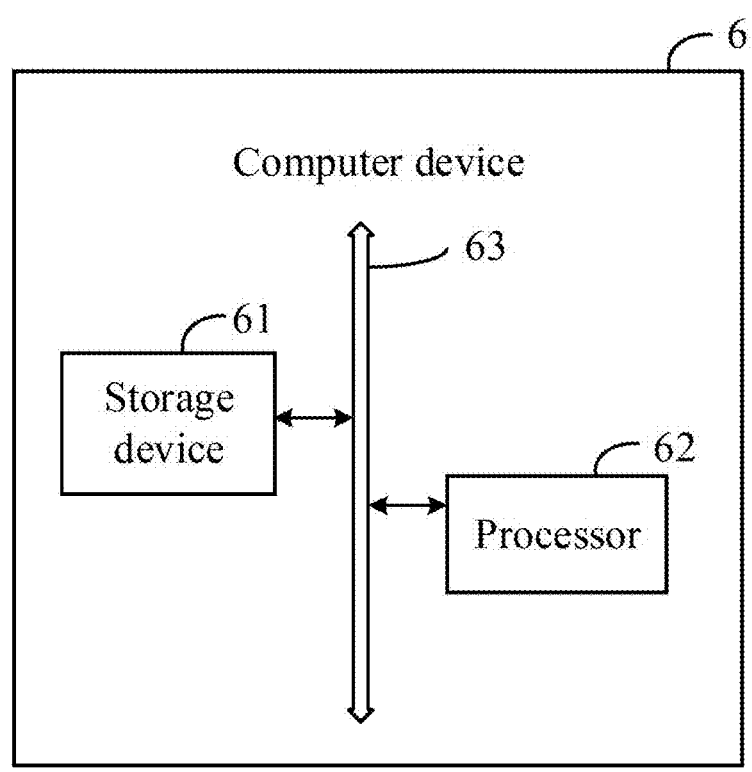
FIG. 6 is a block diagram of one example embodiment of a computer device.

FIG. 6 is a block diagram of one example embodiment of a computer device. In an embodiment, a computer device 6 includes a storage device 61, at least one processor 62, and at least one bus 63. It should be understood by those skilled in the art that the structure of the computer device 6 shown in FIG. 6 does not constitute a limitation of the embodiment of the present disclosure. The computer device 6 may have a bus type structure or a star type structure, and the computer device 6 may further include other hardware or software, or the computer device 6 may have different component arrangements.

In at least one embodiment, the computer device 6 can include a terminal that is capable of automatically performing numerical calculations and/or information processing in accordance with pre-set or stored instructions. The hardware of terminal can include, but is not limited to, a microprocessor, an application specific integrated circuit, programmable gate arrays, digital processors, and embedded devices.

It should be noted that the computer device 6 is merely an example, and other existing or future electronic products may be included in the scope of the present disclosure, and are included in the reference.

In some embodiments, the storage device 61 can be used to store program codes of computer readable programs and various data, such as the GTV segmentation system 50 installed in the computer device 6, and automatically access to the programs or data with high speed during running of the computer device 6. The storage device 61 can include a read-only memory (ROM), a programmable read-only memory (PROM), an erasable programmable read only memory (EPROM), an one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the computer device 6 that can be used to carry or store data.

In some embodiments, the at least one processor 62 may be composed of an integrated circuit, for example, may be composed of a single packaged integrated circuit, or may be composed of multiple integrated circuits of same function or different functions. The at least one processor 62 can include one or more central processing units (CPU), a microprocessor, a digital processing chip, a graphics processor, and various control chips. The at least one processor 62 is a control unit of the computer device 6 which connects various components of the computer device 6 using various interfaces and lines. By running or executing a computer program or modules stored in the storage device 61, and by invoking the data stored in the storage device 61, the at least one processor 62 can perform various functions of the computer device 6 and process data of the computer device 6. For example, the function of performing GTV segmentation.

In some embodiments, the bus 63 is used to achieve communication between the storage device 61 and the at least one processor 62, and other components of the compute device 6.

Although not shown, the computer device 6 may further include a power supply (such as a battery) for powering various components. Preferably, the power supply may be logically connected to the at least one processor 62 through a power management device, thereby, the power management device manages functions such as charging, discharging, and power management. The power supply may include one or more a DC or AC power source, a recharging device, a power failure detection circuit, a power converter or inverter, a power status indicator, and the like. The computer device 6 may further include various sensors, such as a BLUETOOTH module, a Wi-Fi module, and the like, and details are not described herein.

In at least one embodiment, as shown in FIG. 6, the at least one processor 62 can execute various types of applications (such as the GTV segmentation system 50) installed in the computer device 6, program codes, and the like. For example, the at least one processor 62 can execute the modules 501-507 of the GTV segmentation system 50.

In at least one embodiment, the storage device 61 stores program codes. The at least one processor 62 can invoke the program codes stored in the storage device to perform functions. For example, the modules described in FIG. 6 are program codes stored in the storage device 61 and executed by the at least one processor 62, to implement the functions of the various modules for the purpose of GTV segmentation.

In at least one embodiment, the storage device 61 stores one or more instructions (i.e., at least one instruction) that are executed by the at least one processor 62 to achieve the purpose of GTV segmentation.

In at least one embodiment, the at least one processor 62 can execute the at least one instruction stored in the storage device 61 to perform the operations of as shown in FIG. 1.

The steps in the method of the embodiments of the present disclosure may be sequentially adjusted, merged, and deleted according to actual needs.

The above description is only embodiments of the present disclosure, and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A gross tumor volume (GTV) segmentation method being executed by a computer device, the method comprising:

obtaining a positron emission tomography-computer tomography (PET-CT) image pair and a radiotherapy computer tomography (RTCT) image of a predetermined part of a human body;

aligning a PET image in the PET-CT image pair to the RTCT image to obtain an aligned PET image;

using a first progressive semantically nested network (PSNN) to perform a first GTV segmentation on the RTCT image to obtain a first segmentation image;

concatenating the RTCT image and the aligned PET image into a first concatenated image;

using a second PSNN to perform a second GTV segmentation on the first concatenated image to obtain a second segmentation image;

concatenating the RTCT image, the first segmentation image, and the second segmentation image into a second concatenated image; and using a third PSNN to perform a third GTV segmentation on the second concatenated image to obtain an object segmentation image;

wherein the first PSNN, the second PSNN, and the third PSNN reverse a direction of deeply-supervised pathways are based on a progressive holistically nested network (P-HNN) to propagate high-level features to lower-level features.

2. The method according to claim 1, wherein the aligning of the PET image in the PET-CT image pair to the RTCT image to obtain the aligned PET image comprises:

segmenting a first lung region from the diagnostic CT image and a second lung region from the RTCT image in the PET-CT image pair, determining a first lung center from the first lung region and a second lung center from the second lung region;

initially aligning the diagnostic CT image to the RTCT image with the first lung center and the second lung center as initial matching positions;

registering the diagnostic CT image initially aligned to the RTCT image to obtain a deformation field from the diagnostic CT image to the RTCT image; and applying the deformation field to the PET image to obtain the aligned PET image.

3. The method according to claim 2, wherein the segmenting of a first lung region from the diagnostic CT image and a second lung region from the RTCT image in the PET-CT image pair comprises:

using a P-HNN to segment the first lung region from the diagnostic CT image and the second lung region from the RTCT image.

4. The method according to claim 2, wherein the registering of the diagnostic CT image initially aligned to the RTCT image to obtain a deformation field from the diagnostic CT image to the RTCT image comprises:

using a B-spline deformable registration algorithm to register the diagnostic CT image initially aligned to the RTCT image.

5. The method according to claim 1, further comprising:

obtaining multiple training instances, each training instance comprising a RTCT sample image, an aligned PET sample image, and a binary ground truth GTV segmentation image;

inputting the RTCT sample image to the first PSNN to obtain a first GTV probability map of each level of the first PSNN;

calculating a first loss of each level of the first PSNN according to the first GTV probability map and the binary ground truth GTV segmentation image;

optimizing network parameters of the first PSNN according to the first loss.

6. The method according to claim 5, further comprising:

concatenating the RTCT sample image and the aligned PET sample image into a first concatenated image of the training instance;

inputting the first concatenated image of the training instance to the second PSNN to obtain a second GTV probability map of each level of the second PSNN;

calculating a second loss of each level of the second PSNN according to the second GTV probability map and the binary ground truth GTV segmentation image;

optimizing network parameters of the second PSNN according to the second loss.

7. The method according to claim 6, further comprising:

concatenating the RTCT sample image, a first segmentation image of the training instance derived from the first GTV probability map, and a second segmentation image of the training instance derived from the second GTV probability map into a second concatenated image of the training instance;

inputting the second concatenated image of the training instance to the third PSNN to obtain a third GTV probability map of each level of the third PSNN;

calculating a third loss of each level of the third PSNN according to the third GTV probability map and the binary ground truth GTV segmentation image;

optimizing network parameters of the third PSNN according to the third loss.

8. A computer device comprising:

a storage device;

at least one processor, and the storage device storing one or more programs, which when executed by the at least one processor, cause the at least one processor to perform operations comprising:

obtaining a positron emission tomography-computer tomography (PET-CT) image pair and a radiotherapy computer tomography (RTCT) image of a predetermined part of a human body;

aligning a PET image in the PET-CT image pair to the RTCT image to obtain an aligned PET image;

using a first progressive semantically nested network (PSNN) to perform a first GTV segmentation on the RTCT image to obtain a first segmentation image;

concatenating the RTCT image and the aligned PET image into a first concatenated image;

using a second PSNN to perform a second GTV segmentation on the first concatenated image to obtain a second segmentation image;

concatenating the RTCT image, the first segmentation image, and the second segmentation image into a second concatenated image; and using a third PSNN to perform a third GTV segmentation on the second concatenated image to obtain an object segmentation image;

wherein the first PSNN, the second PSNN, and the third PSNN reverse a direction of deeply-supervised pathways are based on a progressive holistically nested network (P-HNN) to propagate high-level features to lower-level features.

9. The computer device according to claim 8, wherein the operation of aligning the PET image in the PET-CT image pair to the RTCT image to obtain the aligned PET image comprises:

segmenting a first lung region from the diagnostic CT image and a second lung region from the RTCT image in the PET-CT image pair determining a first lung center from the first lung region and a second lung center from the second lung region;

initially aligning the diagnostic CT image to the RTCT image with the first lung center and the second lung center as initial matching positions;

registering the diagnostic CT image initially aligned to the RTCT image to obtain a deformation field from the diagnostic CT image to the RTCT image; and applying the deformation field to the PET image to obtain the aligned PET image.

10. The computer device according to claim 9, wherein the segmenting of a first lung region from the diagnostic CT image and a second lung region from the RTCT image in the PET-CT image pair comprises:

using a P-HNN to segment the first lung region from the diagnostic CT image and the second lung region from the RTCT image.

11. The computer device according to claim 9, wherein the registering of the diagnostic CT image initially aligned to the RTCT image to obtain a deformation field from the diagnostic CT image to the RTCT image comprises:

using a B-spline deformable registration algorithm to register the diagnostic CT image initially aligned to the RTCT image.

12. The computer device according to claim 8, wherein the at least one processor is further caused to perform operations comprising:

obtaining multiple training instances, each training instance comprising a RTCT sample image, an aligned PET sample image, and a binary ground truth GTV segmentation image;

inputting the RTCT sample image to the first PSNN to obtain a first GTV probability map of each level of the first PSNN;

calculating a first loss of each level of the first PSNN according to the first GTV probability map and the binary ground truth GTV segmentation image;

optimizing network parameters of the first PSNN according to the first loss.

13. The computer device according to claim 12, wherein the at least one processor is further caused to perform operations comprising:

concatenating the RTCT sample image and the aligned PET sample image into a first concatenated image of the training instance;

inputting the first concatenated image of the training instance to the second PSNN to obtain a second GTV probability map of each level of the second PSNN;

calculating a second loss of each level of the second PSNN according to the second GTV probability map and the binary ground truth GTV segmentation image;

optimizing network parameters of the second PSNN according to the second loss.

14. The computer device according to claim 13, wherein the at least one processor is further caused to perform operations comprising:

concatenating the RTCT sample image, a first segmentation image of the training instance derived from the first GTV probability map, and a second segmentation image of the training instance derived from the second GTV probability map into a second concatenated image of the training instance;

inputting the second concatenated image of the training instance to the third PSNN to obtain a third GTV probability map of each level of the third PSNN;

calculating a third loss of each level of the third PSNN according to the third GTV probability map and the binary ground truth GTV segmentation image;

optimizing network parameters of the third PSNN according to the third loss.

15. A non-transitory storage medium having stored thereon instructions that, when executed by a computer device of a computer device, causes the computer device to perform a gross tumor volume (GTV) segmentation method, the method comprising:

obtaining a positron emission tomography-computer tomography (PET-CT) image pair and a radiotherapy computer tomography (RTCT) image of a predetermined part of a human body;

aligning a PET image in the PET-CT image pair to the RTCT image to obtain an aligned PET image;

using a first progressive semantically nested network (PSNN) to perform a first GTV segmentation on the RTCT image to obtain a first segmentation image;

concatenating the RTCT image and the aligned PET image into a first concatenated image;

using a second PSNN to perform a second GTV segmentation on the first concatenated image to obtain a second segmentation image;

concatenating the RTCT image, the first segmentation image, and the second segmentation image into a second concatenated image; and using a third PSNN to perform a third GTV segmentation on the second concatenated image to obtain an object segmentation image;

wherein the first PSNN, the second PSNN, and the third PSNN reverse a direction of deeply-supervised pathways are based on a progressive holistically nested network (P-HNN) to propagate high-level features to lower-level features.

16. The non-transitory storage medium according to claim 15, wherein the aligning of the PET image in the PET-CT image pair to the RTCT image to obtain the aligned PET image comprises:

segmenting a first lung region from the diagnostic CT image and a second lung region from the RTCT image in the PET-CT image pair, determining a first lung center from the first lung region and a second lung center from the second lung region;

initially aligning the diagnostic CT image to the RTCT image with the first lung center and the second lung center as initial matching positions;

registering the diagnostic CT image initially aligned to the RTCT image to obtain a deformation field from the diagnostic CT image to the RTCT image; and applying the deformation field to the PET image to obtain the aligned PET image.

17. The non-transitory storage medium according to claim 16, wherein the segmenting of a first lung region from the diagnostic CT image and a second lung region from the RTCT image in the PET-CT image pair comprises:

using a P-HNN to segment the first lung region from the diagnostic CT image and the second lung region from the RTCT image.

18. The non-transitory storage medium according to claim 16, wherein the registering of the diagnostic CT image initially aligned to the RTCT image to obtain a deformation field from the diagnostic CT image to the RTCT image comprises:

using a B-spline deformable registration algorithm to register the diagnostic CT image initially aligned to the RTCT image.

19. The non-transitory storage medium according to claim 15, wherein the method further comprises:

obtaining multiple training instances, each training instance comprising a RTCT sample image, an aligned PET sample image, and a binary ground truth GTV segmentation image;

inputting the RTCT sample image to the first PSNN to obtain a first GTV probability map of each level of the first PSNN;

calculating a first loss of each level of the first PSNN according to the first GTV probability map and the binary ground truth GTV segmentation image;

optimizing network parameters of the first PSNN according to the first loss.

20. The non-transitory storage medium according to claim 19, wherein the method further comprises:

concatenating the RTCT sample image and the aligned PET sample image into a first concatenated image of the training instance;

inputting the first concatenated image of the training instance to the second PSNN to obtain a second GTV probability map of each level of the second PSNN;

calculating a second loss of each level of the second PSNN according to the second GTV probability map and the binary ground truth GTV segmentation image;

optimizing network parameters of the second PSNN according to the second loss;

concatenating the RTCT sample image, a first segmentation image of the training instance derived from the first GTV probability map, and a second segmentation image of the training instance derived from the second GTV probability map into a second concatenated image of the training instance;

inputting the second concatenated image of the training instance to the third PSNN to obtain a third GTV probability map of each level of the third PSNN;

calculating a third loss of each level of the third PSNN according to the third GTV probability map and the binary ground truth GTV segmentation image;

optimizing network parameters of the third PSNN according to the third loss.

\* \* \* \* \*